United States Patent [19]

Krohn et al.

[11] Patent Number: 5,320,036
[45] Date of Patent: Jun. 14, 1994

[54] CONTINUOUSLY OPERATING MATERIAL PRESS

[75] Inventors: Manfred Krohn, Ronnenberg; Heino Pick; Wilhelm Brand, both of Hannover, all of Fed. Rep. of Germany

[73] Assignee: Hermann Berstorff Maschinenbau GmbH, Hannover, Fed. Rep. of Germany

[21] Appl. No.: 131,605

[22] Filed: Oct. 5, 1993

Related U.S. Application Data

[63] Continuation of Ser. No. 830,850, Feb. 4, 1992.

[30] Foreign Application Priority Data

Feb. 5, 1991 [DE] Fed. Rep. of Germany ....... 4103342

[51] Int. Cl.⁵ .................................................. B30B 5/04
[52] U.S. Cl. .............................. 100/154; 100/93 RP; 425/373
[58] Field of Search .................... 100/93 RP, 151, 153, 100/154, 156, 160, 161; 162/206, 361; 425/371, 373, 374

[56] References Cited

U.S. PATENT DOCUMENTS

| | | | |
|---|---|---|---|
| 741,257 | 10/1903 | Lawrence | 100/151 |
| 2,442,443 | 6/1948 | Swallow | 100/93 RP |
| 2,812,542 | 11/1957 | Bleher | 100/93 RP |
| 3,319,352 | 5/1967 | Haigh | 162/206 |
| 3,676,268 | 7/1972 | Brandenburg | 100/154 |
| 3,799,052 | 3/1974 | Kusters | 100/93 RP |
| 3,874,962 | 4/1975 | Gersbeck | 425/373 |
| 3,973,483 | 8/1976 | Appenzeller | 100/93 RP |
| 4,089,738 | 5/1978 | Kankaanpaa | 100/161 |
| 4,524,589 | 6/1985 | Fleissner | 100/156 |
| 4,877,487 | 10/1989 | Miller | 100/93 RP |
| 5,085,140 | 2/1992 | Kunig | 100/156 |

FOREIGN PATENT DOCUMENTS

| | | | |
|---|---|---|---|
| 575473 | 4/1933 | Fed. Rep. of Germany | 162/361 |
| 1704767 | 2/1971 | Fed. Rep. of Germany | |
| 2311909 | 9/1974 | Fed. Rep. of Germany | |
| 382829 | 7/1909 | France | 100/153 |
| 1224558 | 6/1960 | France | 162/206 |
| 574073 | 3/1958 | Italy | 100/156 |
| 66929 | 11/1950 | Netherlands | 425/373 |
| 327433 | 1/1958 | Switzerland | 100/93 RP |
| 534371 | 6/1975 | U.S.S.R. | 100/151 |

Primary Examiner—Philip R. Coe
Assistant Examiner—Randall E. Chin
Attorney, Agent, or Firm—Foley & Lardner

[57] ABSTRACT

A continuously operating material press comprising temperature-controllable and drivable central drum 1 and a tensioned endless steel belt which passes around a major portion of the surface of the central drum and is supported by at least two guide drums and a tensioning drum. An increase in the pressure acting on a strip of material which is guided between the steel belt and the surface of the central drum is achieved by providing an additional pressing means which comprises a roller chain and an additional high-tensile steel belt supported by the chain. Both the roller chain and the additional steel belt are connected to a support structure for the central drum either directly or through the intermediary of tensioning devices.

10 Claims, 5 Drawing Sheets

CONTINUOUSLY OPERATING MATERIAL PRESS

This application is a continuation of application Ser. No. 07/830,850, filed Feb. 4, 1992.

FIELD OF THE INVENTION

The present invention relates to a continuously operating material press. More particularly, the present invention relates to a material press which can be used for manufacturing boards from a variety of materials as well as webs of synthetic material and paper.

BACKGROUND OF THE INVENTION AND PRIOR ART DISCUSSION

Material presses of this general type are known. One such known press comprises a drivable central drum, the temperature of which is controllable. An endless steel belt passes over a tensioning drum and at least two guide drums as well as the central drum. The material to be processed is guided between the tensioned steel belt and the external surface of the central drum whereby the material is pressed in a temperature-controlled manner. Additional pressing means are disposed adjacent a portion of the periphery of the central drum on the side of the steel belt remote from the material being treated.

Such a press permits the production of thin products, such as webs of paper, textile, fibreboard and chipboard to be achieved. Moreover, the use of such a press as a cross-linking device for webs of rubber or thermoplastic materials has also been known for a long time. By way of contrast with a calendering system, such presses are generally used when the application of a temporary line pressure as the web of material passes between two rollers is not sufficient to sub the material to the desired cross-linking conditions.

However, when such presses are used for producing chipboards of relatively large thickness and/or high material density, the maximum pressure which can be applied and which is dependent upon the tensile strength of the steel belt, has proved to be too low. Proposals hitherto for increasing the pressure which can be applied by the steel belt are not, however, suitable for continuously producing chipboards or fibreboards having a high density. In consequence, it has long been desired to be able to manufacture boards having a better homogeneity and a better density profile over the board thickness, so that mechanically more stable products can be produced. However, this requires a considerably higher pressing force to be applied to the web of material than has hitherto proved possible using known arrangements.

In German Auslegeschrift No. DE-AS 17 04 767, an arrangement which attempts to overcome this problem is disclosed. In such arrangement, the steel belt acting on the material is pressed thereagainst by a pressure plate. The plate has a substantially semicircular configuration and acts on the steel belt from externally. Such plate is connected to an arcuate carrier through the intermediary of a plurality of hydraulic pressure piston and cylinder arrangements. The carrier is supported on the bearing shafts for the central drum by means of lateral plates, so as to be rotatably mounted thereon. The pressure plate is pressed against the steel belt by means of the hydraulic piston and cylinder arrangements and, in consequence, the pressure acting on the strip of material can be increased.

This arrangement is, however also disadvantageous, in that the entire pressing means must move with a steel belt during rotation of the central drum. It must then be returned to its initial position at the end of a pressing cycle when both the central drum and the steel belt are stationary. The pressure plate is then replaced in position on the steel belt and pressed thereagainst so that the central drum, the steel belt and the pressing means can process an additional portion of the strip of material. Such an arrangement can therefore only be used to produce endless webs of material in an intermittent and, hence, time-consuming and cost-intensive operation. In addition, the provision of a solid pressure plate only permits the processing of materials which do not suffer large reduction in their web thickness due to their pressing between the surface of the central drum and the steel belt. The reduction in thickness, which usually occurs during the production of chipboards and fibreboards, causes, even with thick webs of material, a visible reduction in the required radius of curvature of the pressure plate when a surface-to-surface pressing operation is also required. It is true that adaptation to the varying radius of curvature can be substantially achieved by the hydraulic piston and cylinder arrangements but this impairs the material strength of the pressure plate which is permanently loaded in a non-uniform manner. In addition, the possibility of the pressure plate becoming locally deformed cannot be excluded, so there can be no guarantee that the pressing force will act uniformly over the entire contact surface. It is, of course, the uniformity of application of such force which determines the quality of the end product. Finally, this arrangement requires a considerable amount of material, particularly if the pressure plate is to be pressed against the steel belt over the entire roller width by means of hydraulic piston and cylinder arrangements which are disposed in a grid-like array as would be the case if it is desired to eliminate the use of a steel belt entirely so as to preclude deformation of the end product.

Similar disadvantages are also to be found in the arrangement disclosed in German Auslegeschrift No. DE-AS 23 11 909. Such prior document discloses the application of the additional pressing force to the steel belt by means of an endless roller belt which is acted upon by a tensioning device comprising two half-shells. In such arrangement, the roller belt is guided by means of guide rollers and tensioning rollers onto the outer surface of the steel belt and rotates around the central drum with the steel belt.

Two half-shells, which are interconnected by means of an adjusting lever and tensioning device, cover the roller belt and exert a pressure thereon. This, obviously, increases the pressing force which acts on the web of material through the intermediary of the steel belt.

Since the maximum transferable pressing force depends on the tensile strength of the belt and of the half-shells, the required high force cannot be exerted upon the strip of material utilising such an arrangement. In addition, the strip of material experiences a disadvantageous, sudden reduction in the pressure applied thereto approximately after halfway along its circumferential path around the central drum. This pressure reduction occurs in the region of the junction between the two half-shells, because the half-shells do not abut one another in a flush manner in such region.

In consequence, it has not hitherto proved possible, utilising known additional pressing means, to produce webs of material having different final thicknesses. This is because the radius of curvature of the pressure plate is selected in dependence on the value which results from the sum of the central drum radius, the end thickness of the strip of material, the thickness of the endless steel belt and, possibly, the height of the roller chain.

OBJECTS OF THE INVENTION

The present invention seeks to provide a material press in which the disadvantages of known arrangements are obviated or at least minimized. The present invention also seeks to provide a continuous press which permits webs of material to be produced from materials which cause the web being produced to experience a considerable reduction in thickness during the pressing operation and which also permits the homogeneity of the material density of the web to be improved.

SUMMARY OF THE INVENTION

According to the present invention, there is provided a continuously operating material press for producing endless boards or webs comprising a temperature-controllable and drivable central drum, an endless, tensioned steel belt located adjacent a portion of the external surface of the central drum, the belt passing over at least two guide drums and a tensioning drum, the material to be processed being guided between the external surface of the central drum and the steel belt, whereby the temperature of the material is controlled and the material is pressed, and additional pressing means which are disposed radially outwardly of the steel belt and act on the rear surface of the belt remote from the web of material, wherein the additional pressing means comprises a roller chain disposed radially outwardly of and acting on the face of the endless steel belt remote from the central drum, and a further steel belt supported by said chain through the intermediary of links connecting the individual rollers of the roller chain, the further steel belt and the roller chain each being connected at one of their ends to a support structure of the press, the other ends of the belt and chain also being connected to the support structure by means of tensioning devices which control the tension in said chain and in the further steel belt.

By using such a press, the pressure acting on the web of material being treated can be increased to such an extent that the desired homogeneity of density in the material is achieved and this, in turn, brings about an improvement in the strength of the finished product. In addition, the press of the present invention can be used for continuously producing webs of material with a relatively large thickness (up to 12 mm) without any adverse affect on the mechanical strength of the product.

It is particularly significant that, despite the comparatively simple and hence economical, mechanical construction of the press of the present invention, particularly the additional pressing means, an effective increase can be achieved in the pressing force acting on the strip of material from the 20 to 60 N/cm$^2$ hitherto attainable to approximately 100 to 200 N/cm$^2$.

To enable this to be achieved, the roller chain is pressed against the endless steel belt by the additional, high-tensile steel belt. The roller chain preferably comprises, a plurality of individual roller bodies, the axes of rotation of which are interconnected by link members. These link members support the high-tensile steel belt so that, on the one hand, the roller bodies are each freely rotatable about their longitudinal axes and, on the other hand, the additional pressing force is transferable to the endless steel belt.

To secure the roller chain over a portion of the length of the endless steel belt looped around the central drum, the roller chain is advantageously connected at both of its ends to a support structure for the material press, with one end connection to the support structure but through the intermediary of at least one tensioning device.

Just like the roller chain, the additional high-tensile steel belt may also be connected at each of its ends to the support structure for the material press, the connection of one of the ends being through the intermediary of at least one tensioning device. In this case, however, the tensioning devices not only serve to secure the steel belt over the endless steel belt and the roller chain but also subject the additional steel belt to a high tension loading. An additional force, directed towards the axis of rotation of the central drum, results from this connection and such force produces an increase in the pressure acting on the strip of material being treated.

The roller chain and the additional high-tensile steel belt can, if desired, be formed from a plurality of individually extruded bodies, whereby the pressing force acting on the material being treated can be individually controlled in different locations. In addition, such individually extruded bodies can be maintained and replaced more easily and more economically than an integral roller chain or steel belt.

In order to improve further cross-linking conditions existing in the material press, provision may be made for the additional high-tensile steel belt to be provided with temperature-controlling means on its surface remote from the roller belt, that is to say, its radially outer surface. Such means may, for example, be in the form of electrical heating elements or flexible tubes.

If it is desired to produce strips of material which have a relatively large thickness and which additionally have increased homogeneity of density in respect of the thickness of the strip of material, the additional pressing means may include further features. In such circumstances, the additional pressing means may further include a supporting structure which has a curvature substantially corresponding to that of the high-tensile steel belt. Pressure bellows may be provided on the supporting structure which bellows have flexible walls which press against the radially outward surface of the high tensile steel belt externally when they are subjected to excess pressure.

An additional advantage of the invention is that the pressing means are relatively easily accessible and can be achieved with minimal material outlay. In addition, with such a material press, it is easily possible to produce strips of material of variable thickness, because the roller chain and the high-tensile steel belt are flexibly adapted to the pressure radii which vary with different material thickness.

Finally, if the roller chain and the high-tensile steel belt are pivotally mounted as is possible, this affords reliable protection against mechanical damage caused by a slight shifting movement away from the central drum such as that which occurs if, for example, solid foreign bodies undesirably pass between the roller belt and the endless steel belt.

BRIEF DESCRIPTION OF THE DRAWINGS

Various embodiments of a material press in accordance with the present invention will be further described, by way of example, with reference to the accompanying drawings, in which.

DESCRIPTION OF PREFERRED EMBODIMENTS

Figure 1:
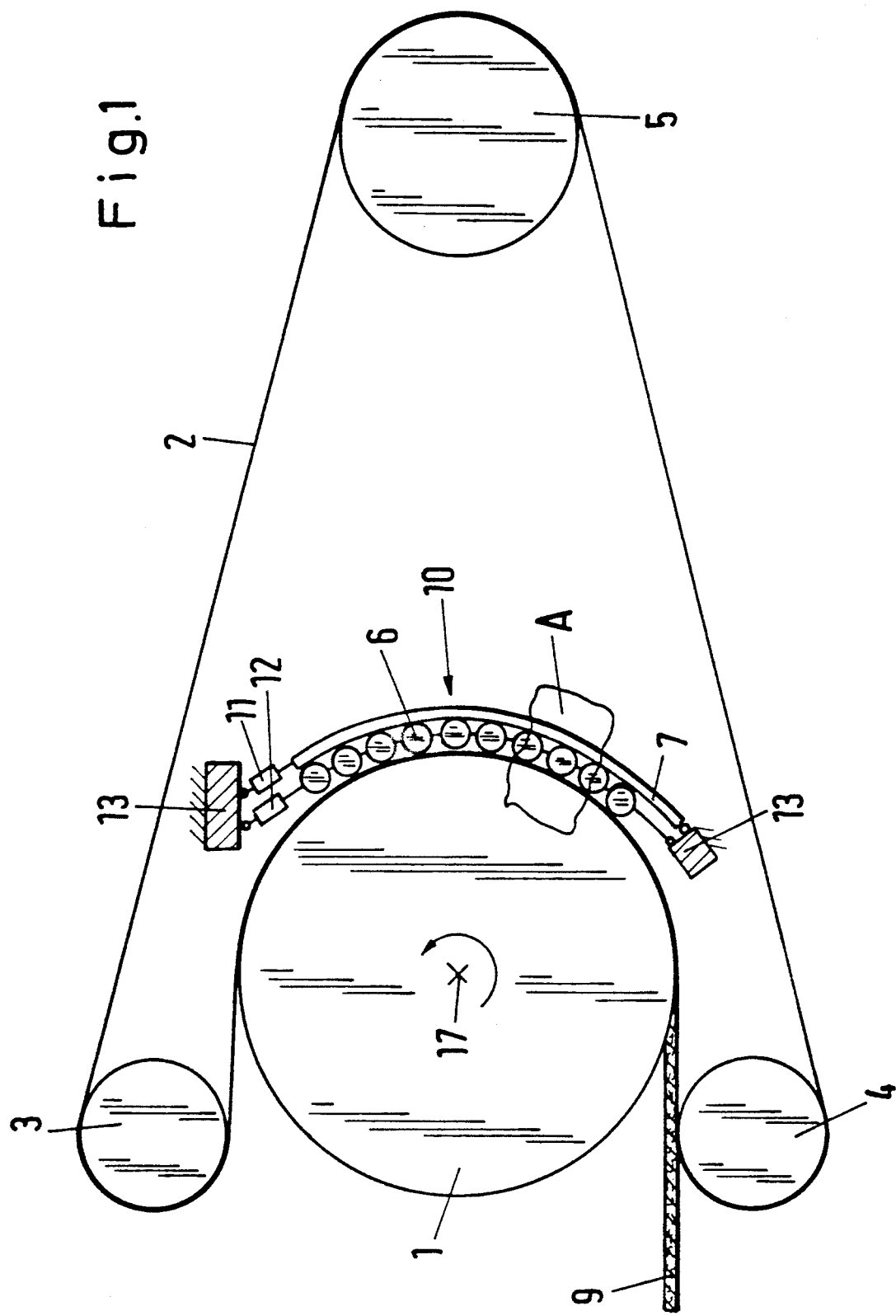
FIG. 1 is a schematic side elevational view of a material press in accordance with the present invention and including both first and additional pressing means for pressing the material.

In FIG. 1, there is shown a continuous material press which comprises a temperature-controllable and drivable central drum 1, two guide drums 3 and 4, and a tensioning drum 5 over which an endless steel belt 2 passes. The press further includes an additional pressing means 10 and a support structure 13 for the press, which support stand is only indicated very schematically in FIG. 1.

The steel belt 2 is looped in known manner around the central drum 1, the guide drums 3 and 4 and the tensioning drum 5, and an endless strip of material 9 is fed between the steel belt 2 and the surface of the central drum 1. The strip 9 is moved jointly by the central drum 1 and the belt 2 and is subjected to preselected temperatures and, by virtue of the provision of the tensioned steel belt 2, to a defined surface-to-surface pressing operation during the time while it is in contact with the drum surface.

To increase the pressing force applied to the strip 9 by the steel belt 2, a roller chain 6 is provided along part of the length of the strip of material 9 which is in contact with the central drum 1. Such roller chain 6 forms one embodiment of the additional pressing means 10. The chain 6 is made up of a plurality of individual roller bodies 15, which bodies 15 are interconnected through the intermediary of connecting links 8 (see FIG. 2). The roller chain 6 is constructed, in a manner known per as a flat structure which approximately spans the width of the central drum. In this embodiment, the roller bodies 15 are disposed internally of the chain assembly such that their raceways are covered. To reduce maintenance costs further, the roller chain 6 may be formed from individual extruded bodies.

The entire length of the roller chain 6 lies on the steel belt 2 and, in this embodiment, one end thereof is directly connected to the support structure 13 for the material press at its one end through the intermediary of a pivot joint (not shown). The other end of the roller chain 6 is tensioned by one or more tensioning devices 12, to cause the roller chain 6 to be located in its contact position with the belt 2. The tensioning devices 12, which may be tension springs or piston-and-cylinder arrangements, are connected to the support structure 13.

Figure 2:
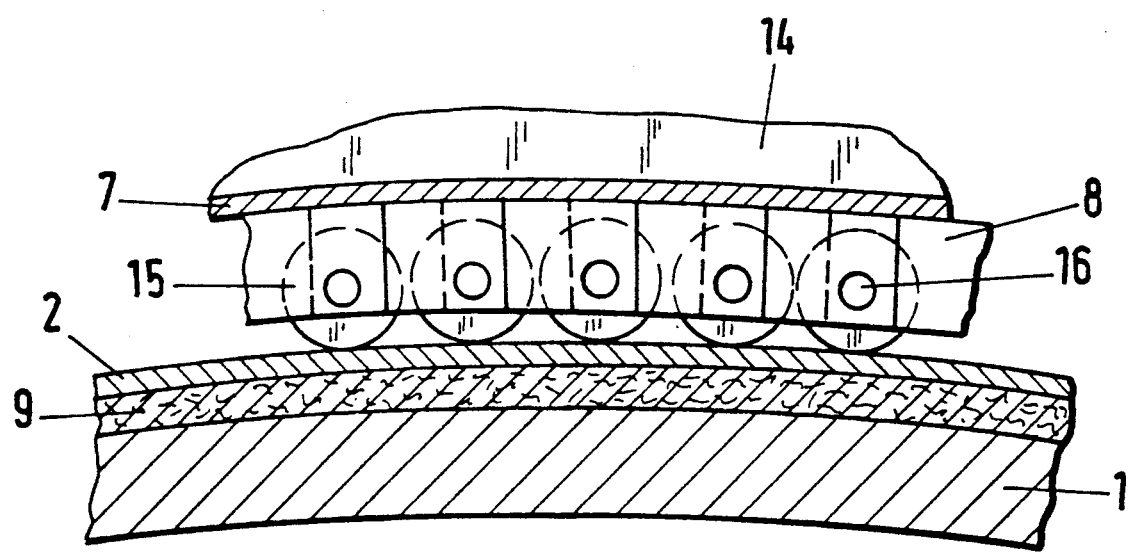
FIG. 2 shows, on an enlarged scale and partially in section, the detail A ringed in FIG. 1.

The roller bodies 15 have axes of rotation 16 interconnected by links 8. The links 8 are so designed that they protrude above, that is to say, radially outwardly of the roller bodies and form, beyond the roller chain 6, a support frame for an additional, high-tensile steel belt 7 which lies thereon, as can be seen in FIG. 2. It will be noted that the axes of rotation 16 for the rollers are located relative to the links 8 such that each roller 15 overlaps at least 2 of the link members. Temperature controlling devices 14 are provided on the radially outer face of the additional belt 7.

Similarly to the roller chain 6, the steel belt 7 is in this embodiment connected at one of its ends to the support structure 13 by means of a pivot joint. The other end of the belt 7 is connected to the support structure 13 through the intermediary of at least one tensioning device 11.

The tensioning devices 11, which in this embodiment are piston-and-cylinder arrangements, exert a high tensile force on the steel belt 7 such that the belt is located on the support frame formed by the connecting links 8. The force acting on the belt 7 is transmitted in the direction toward the axis of rotation 17 of the central drum 1. Such force is transmitted through the roller bodies 15 and the endless steel belt 2 to the strip of material 9. The overall width of the roller chain 6 and additional steel belt 7 is at least equal to the maximum width of the strip of material being treated.

Figure 3:
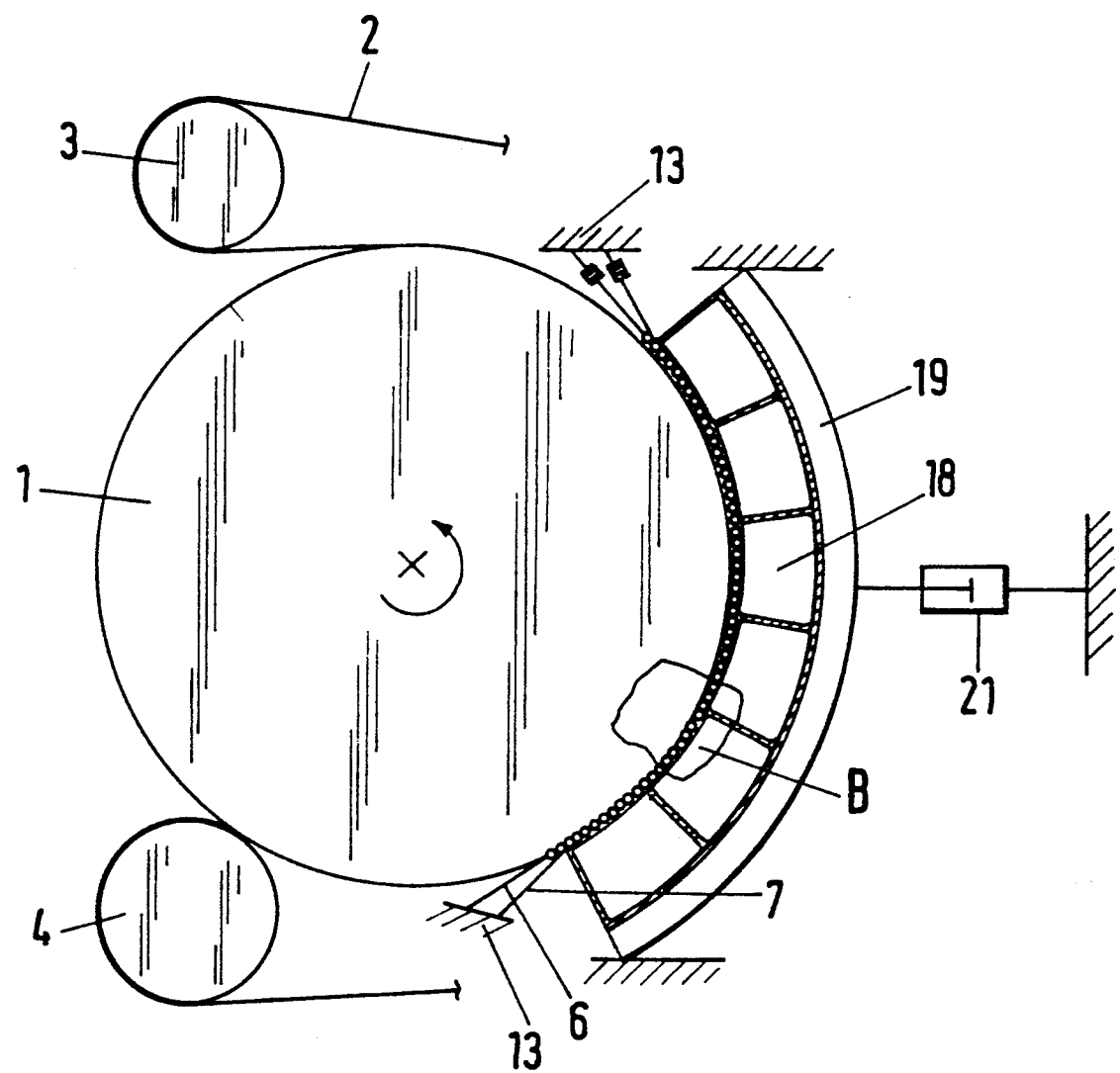
FIG. 3 is a schematic side elevational view of the material press shown in FIG. 1, but further including a support structure means.
Figure 4:
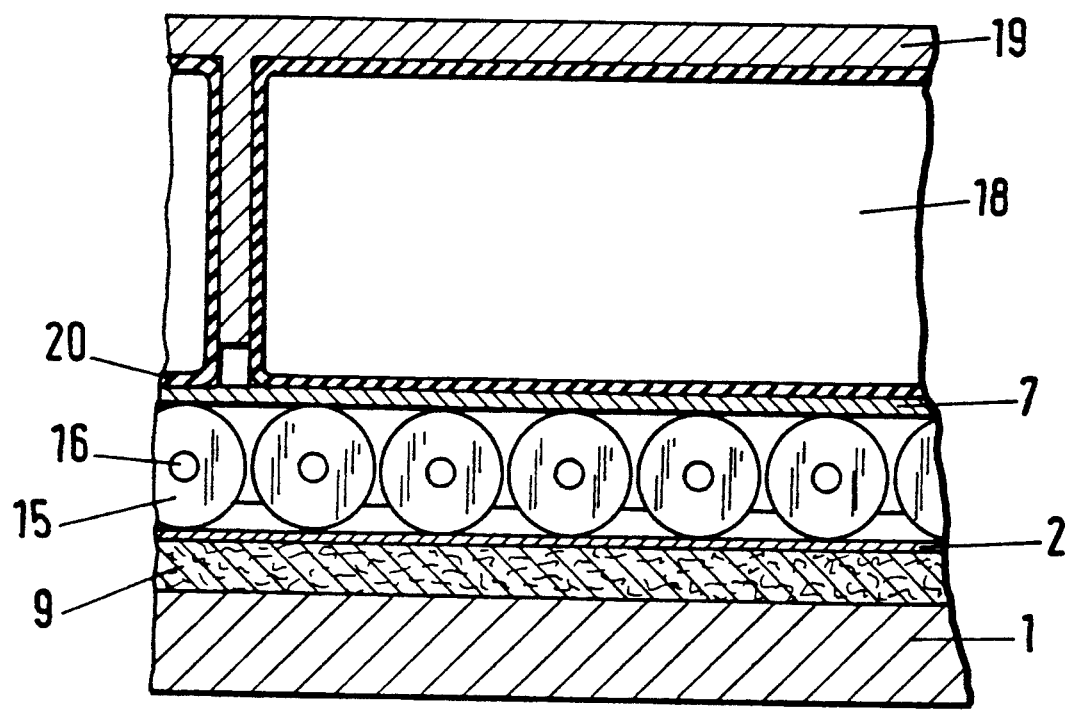
FIG. 4 shows on an enlarged scale and partially in section, the detail B ringed in FIG. 3.

If it is desired to produce webs of material having a thickness of up to 12 mm and having an improved homogeneity of density using the material press of the present invention, the additional pressing means may include further features. Such an arrangement is illustrated in FIGS. 3 and 4. The arrangement includes a supporting structure 19, which is securely connected to the support structure 13 and is disposed above the high-tensile steel belt 7, that is to say, on the side thereof remote from the roller chain 6. The supporting structure 19 has a shape which corresponds substantially to the curved configuration of the steel belt 7. On the portion of the supporting structure 19 facing the steel belt 7, a plurality of pressure bellows 18 are provided which extend in the direction of the width of the central drum 1. The bellows 18 have flexible walls 20 which are in contact with the steel belt 7.

The pressure bellows 18 are maintained at an excess pressure by a pressure generating and distribution system (not shown) utilising a temperature-controllable pressurised gas or fluid. The supporting structure 19, by means of its pressure bellows 18, thus presses against the steel belt 7. To enable this pressing device to be better maintained, a piston-and-cylinder arrangement 21 may be provided to permit displacement of the supporting structure 19 away from the steel belt 7.

Such additional pressing means has a particularly advantageous effect in that it exerts a highly uniform surface-to-surface pressing action on the steel belt 7. Moreover, additional pressing force acting on the web of material 9 can be increased or reduced by selectively actuating individual pressure bellows. Finally, provision may also be made for these additional pressing means to act directly on the endless steel belt 2 through the intermediary of an appropriate lubricating film (not shown).

Figure 5:
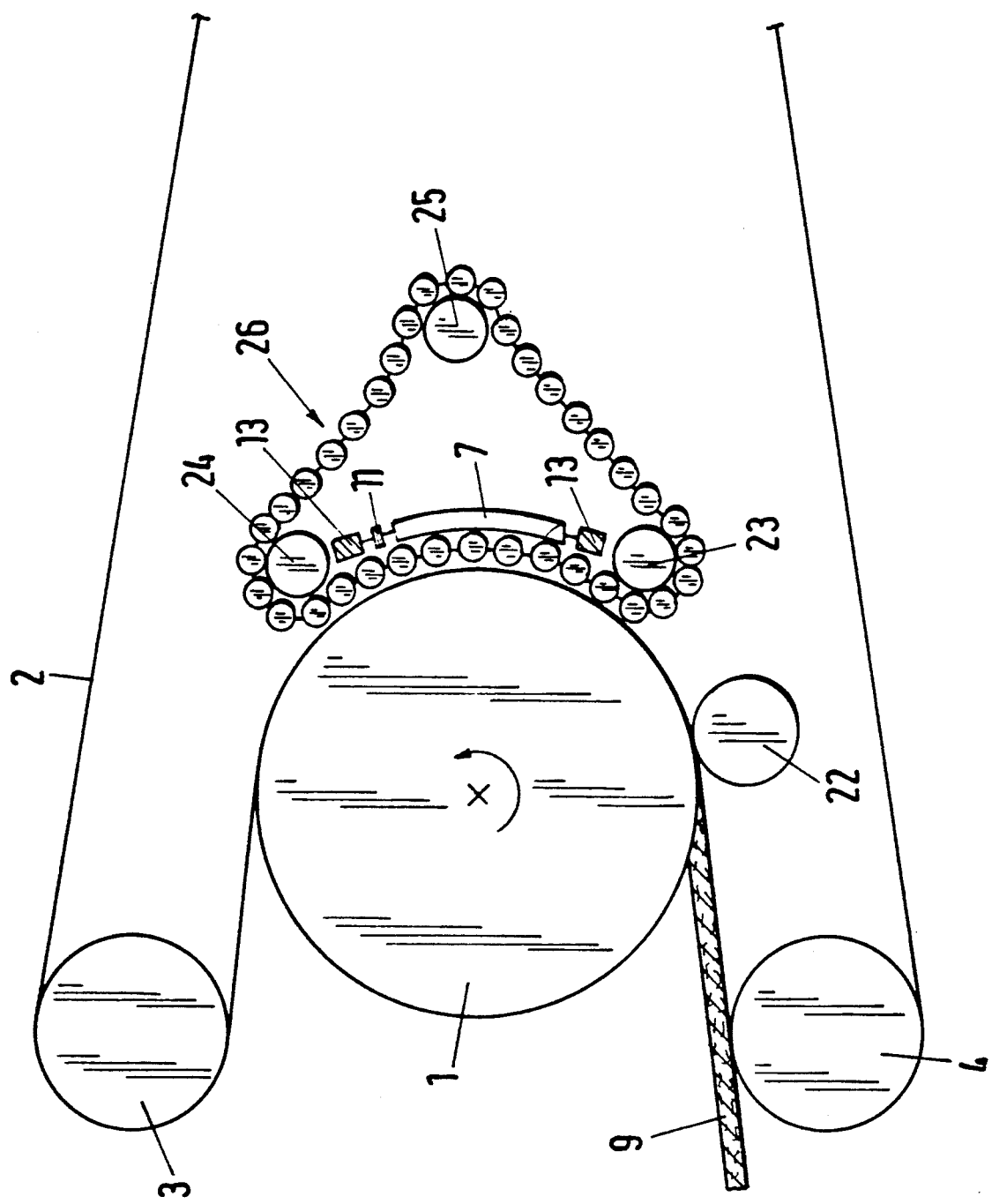
FIG. 5 shows a schematic side elevational view of the material press shown in FIG. 1, but further including an endless roller chain.

In a further variation of the invention, the material press may be provided with an additional feed drum 22 and an endless roller chain 26. Such an arrangement is shown in FIG. 5. The feed drum 22 is disposed adjacent the central drum 1 in the feed region of the material 9 and upstream of the additional pressing means. The drum 22 ensures a first initial compression of the strip of material 9. The endless roller chain 26, which is guided over guide drums 23 and 24 and a tensioning drum 25, may also exert an additional pressing effect on the material 9 to be pressed or extruded.

We claim:

1. A continuously operating material press for producing endless boards and webs comprising:
   (a) a central drum having a longitudinal axis and a curved external surface spaced from said axis, and drive means associated with said drum for rotating said drum about said longitudinal axis;
   (b) an endless steel belt positioned around a circumferential portion of said drum, said belt including first and second opposed major surfaces, said first major surface defining, with said external surface of said drum, a channel for the passage of material to be pressed between said belt and said external surface of said drum, said belt extending approximately 180° around said drum including the rearmost portion of said drum;
   (c) guide drums supporting and guiding said endless steel belt;
   (d) a tensioning drum for tensioning said endless steel belt;
   (e) additional pressing means engaging an arcuate segment of said second major surface of said endless belt only in a region outwardly of said rearmost portion of said drum for transmitting pressure through said belt to said material only in the region of the rearmost portion of said drum, said additional pressing means comprising a stationary roller chain disposed outwardly of and abutting against said arcuate segment of second major surface of said endless steel belt, said roller chain comprising a plurality of individual adjacently disposed and connected rollers adapted to engage said arcuate segment of said second major surface of said endless steel belt, and a further steel belt section disposed radially outwardly of and engageable with said rollers, said further steel belt being stationary and having opposed first and second end regions,
   (f) a fixed support structure mounting said roller chain and said first and second end regions of said further steel belt, and
   (g) a tensioning device interposed between said second end region of said further steel belt and said support structure for controlling the tension on said further steel belt.

2. A press as recited in claim 1, wherein said roller chain has opposed first and second end regions connected to said fixed support structure, said second end region being connected to the fixed support structure through a tensioning device.

3. A press as recited in claim 2, further comprising means pivotally mounting said first end regions of said roller chain and said further steel belt on said fixed support structure.

4. A press as recited in claim 1, wherein said further steel belt has first and second opposed major surfaces, and further comprising link members mounting and interconnecting adjacent rollers, said link members supporting said first major surface of said further steel belt, and said second major surface of said further steel belt mounting additional temperature control means.

5. A press as recited in claim 4, wherein each of said individual rollers of said roller chain has an axis of rotation, said link members connecting said axes of rotation such that each said roller overlaps at least two of said link members.

6. A press as recited in claim 1, wherein said tensioning devices are tension springs.

7. A press as recited in claim 1, wherein said tensioning devices are piston and cylinder arrangements.

8. A press as recited in claim 1, wherein said roller chain is formed from a plurality of interconnected individual extruded bodies.

9. A press as recited in claim 1, wherein said further steel belt is formed from a plurality of interconnected, individually extruded bodies.

10. A press as recited in claim 1, wherein the overall width of said roller chain and said further steel belt is at least equal to the maximum width of the strip of material being treated.

* * * * *